United States Patent [19]
Duffy et al.

[11] Patent Number: 5,336,013
[45] Date of Patent: * Aug. 9, 1994

[54] SEPARABLE CONNECTING DEVICE FOR STEERING COLUMN

[75] Inventors: Paul E. Duffy, Winsted; John Hanson, West Hartford; Robert Lugosi, Canton; Spencer H. Guptill, New Milford; Matthew Kackowski, Torrington, all of Conn.

[73] Assignee: The Torrington Company, Torrington, Conn.

[ * ] Notice: The portion of the term of this patent subsequent to Sep. 28, 2010 has been disclaimed.

[21] Appl. No.: 947,582

[22] Filed: Sep. 21, 1992

Related U.S. Application Data

[63] Continuation of Ser. No. 680,162, Apr. 3, 1991, Pat. No. 5,248,214.

[51] Int. Cl.⁵ .............................................. B62D 1/18
[52] U.S. Cl. ........................................ 403/2; 403/24; 74/492
[58] Field of Search ................ 403/2, 24, 1, 206, 389; 74/492; 280/777

[56] References Cited

U.S. PATENT DOCUMENTS

| | | | |
|---|---|---|---|
| 1,572,519 | 2/1926 | Davis | 74/492 |
| 3,424,263 | 1/1969 | Black | 74/492 |
| 3,472,093 | 10/1969 | Tenniswood | 74/492 |
| 3,752,007 | 8/1973 | Blondeleau et al. | 74/492 |
| 3,760,649 | 9/1973 | Decouton et al. | 74/492 |
| 3,960,031 | 1/1976 | Chometon et al. | 74/492 |
| 4,086,825 | 5/1978 | Badcock et al. | 74/492 |
| 4,133,220 | 1/1979 | Wenninger | 74/492 |
| 4,156,372 | 5/1979 | Wenninger | 74/492 |
| 4,411,167 | 10/1983 | Mohr | 403/2 X |
| 4,730,508 | 3/1988 | Haldric et al. | 74/492 |
| 5,074,161 | 12/1991 | Hancock | 74/492 |
| 5,201,545 | 4/1993 | Boersma | 403/2 X |

FOREIGN PATENT DOCUMENTS

0497118A2  8/1992  European Pat. Off. .
1927173  12/1970  Fed. Rep. of Germany .

OTHER PUBLICATIONS

Photograph, Ford separable steering column.
BMW Service Bulletin, 32 02 86, Dec. 1986.

Primary Examiner—Randolph A. Reese
Assistant Examiner—Harry C. Kim
Attorney, Agent, or Firm—John C. Bigler; Michael H. Minns

[57] ABSTRACT

Two shaft sections have a common axis and overlapping end portions. Connecting pins on the end portions extend through sleeves on the end portions. A snap ring or similar device is releasably attached to the connecting pins to hold the connecting pins within the sleeves and to release the connecting pins when a predetermined force is applied. Alternatively, a deformable strap holds flanges on the end portions together and releases the flanges when a predetermined force is applied. Also disclosed is a sequential connecting device having a second mechanism to hold the two end portions together after the initial release and to provide a second release when a second predetermined force is applied.

14 Claims, 3 Drawing Sheets

SEPARABLE CONNECTING DEVICE FOR STEERING COLUMN

This application is a continuation of application Ser. No. 680,162, filed Apr. 3, 1991, U.S. Pat. No. 5,248,214.

BACKGROUND OF THE INVENTION

This invention relates generally to steering columns and, more particularly, to motor vehicle steering columns which are separable in the event of impact.

When a motor vehicle is subjected to a front impact, the steering column and the steering wheel of the vehicle have a dangerous tendency to be displaced toward the driver. Various arrangements have been proposed to provide a separation of the steering column in order to avoid such displacement of the steering column and steering wheel.

One such proposed arrangement relies upon a frictional fit of several connecting pins to connect two shaft sections of the steering column. The connecting pins extend slidably from one shaft section through sleeves on the other shaft section. The sleeves are made of a high friction plastic to provide gripping of the connecting pins to ensure controlled sliding between the connecting pins and the sleeves. When an axial force is applied to the shaft sections of the steering column, the connecting pins slide completely from the sleeves to allow the two shaft sections to be released from each other.

Since a separable connecting device for a steering column is to be a safety feature, the device must meet extremely high reliability requirements to be useful. If the device separates at too low an axial force, the driver would lose steering control when the vehicle is not disabled by a severe impact. And, if the device separates at too high an axial force, the driver would receive no benefit from the device when the vehicle suffers a severe impact. For that reason, a "force window" may be defined between minimum and maximum axial forces within which separation of the steering column should occur.

Because the previously described proposed arrangement relies upon friction to provide the separation force, the actual force required to effect separation of the two shaft sections cannot be controlled accurately. The frictional force varies widely, for example, due to thermal expansion of the pin and due to thermal relaxation of the plastic sleeve. In addition, the performance of the plastic sleeve deteriorates over the life of the motor vehicle. And, tolerances must be closely controlled to produce the necessary interference fit, resulting in considerable manufacturing difficulty and high cost.

Even if such a proposed separation device could provide separation over a specified axial force window over a wide temperature range, there is no assurance that the intended function will be performed in the event of a severe vehicle impact. The environment of a vehicle crash is only imperfectly understood, resulting in uncertainty as to the direction of load on the steering column and as to the amount of the axial component of the load.

The foregoing illustrates limitations known to exist in present separable connecting devices for steering columns. Thus, it is apparent that it would be advantageous to provide an alternative directed to overcoming one of more of the limitations set forth above. Accordingly, a suitable alternative is provided including features more fully disclosed hereinafter.

SUMMARY OF THE INVENTION

In one aspect of the present invention, this is accomplished by providing a separable connecting device for a steering column having two shaft sections which have a common axis and which include overlapping end portions. The device includes connecting pins extending from one end portion and a sleeve on the other end portion complementary to the connecting pin such that the connecting pin extends through the sleeve. A mechanical means attached to the free end of the connecting pin holds the two shaft sections together.

The foregoing and other aspects will become apparent from the following detailed description of the invention when considered in conjunction with the accompanying drawing FIGURES.

BRIEF DESCRIPTION OF THE DRAWING FIGURES

DETAILED DESCRIPTION

Figure 1:
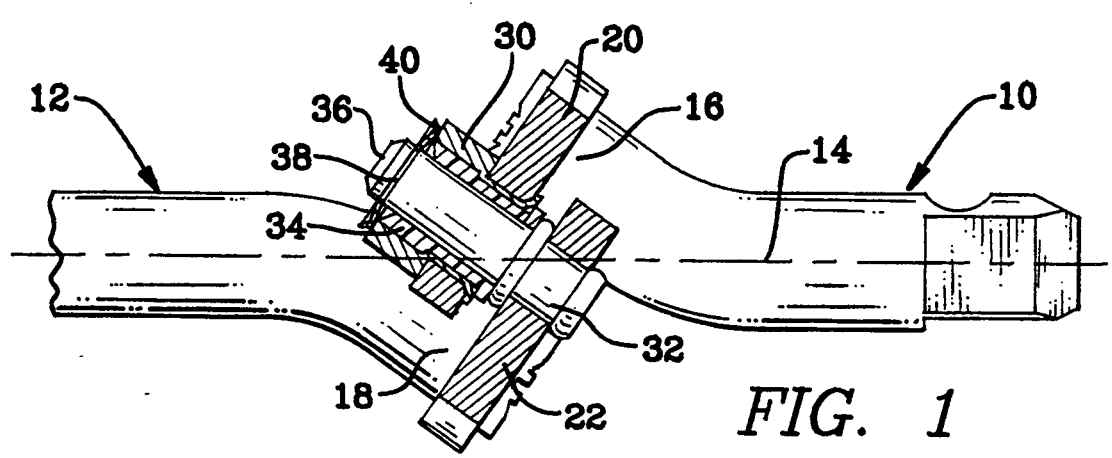
FIG. 1 is an elevational view, in section, of an intermediate portion of a steering column illustrating a preferred embodiment of the present invention.
Figure 2:
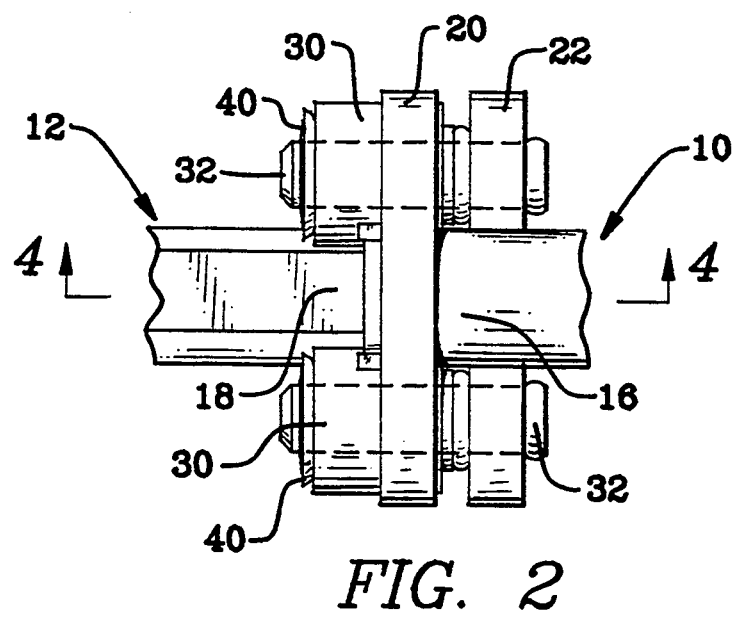
FIG. 2 is an angular top view of the embodiment of FIG. 1.

FIGS. 1 and 2 show an intermediate portion of a steering column comprising two shaft sections 10 and 12 joined by a preferred embodiment of the separable connecting device of the present invention. The shaft sections 10 and 12 have a common axis 14 and end portions 16 and 18, respectively, that are inclined with respect to the common axis 14 so that the end portions overlap each other and are offset from the common axis 14.

Figure 3:
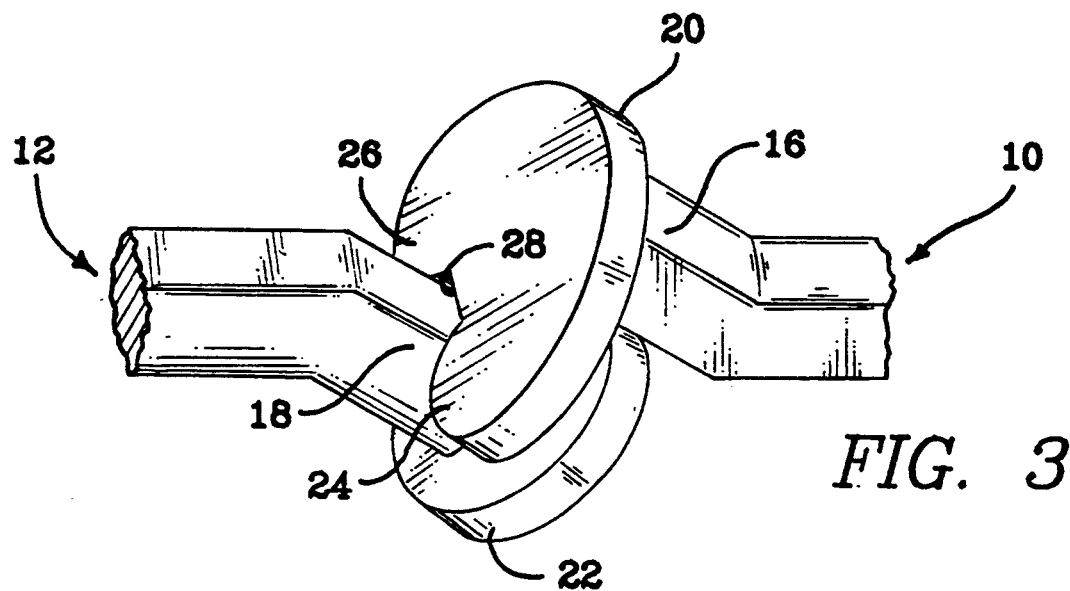
FIG. 3 is schematic pictorial view of the two shaft sections and flanges of the embodiment of FIG. 1.

Flanges 20 and 22 are fixed to the end portions 16 and 18, respectively, by an interference fit, staking, welding or other means. As indicated schematically in FIG. 3, the flanges 20 and 22 are parallel plates that are generally kidney shaped, each plate having lateral projecting portions 24 and 26 which define a cavity 28 therebetween for the passage of the end portion to which the other flange is mounted. Due to the end portions 16 and 18 being in overlapping relationship, axial movement of the shaft sections 10 and 12 toward each other causes the flanges 20 and 21 to move away from each other.

As shown in FIGS. 1 and 2, a steel tubular sleeve 30 is mounted perpendicularly on each of the lateral projecting portions 24 and 26 of flange 20 to receive a steel connecting and aligning pin 32. Two connecting and aligning pins 32 are used, one mounted perpendicularly on each of the lateral projecting portions 24 and 26 of flange 22. The tubular sleeves 30 and connecting and aligning pins 32 are fixed to the flanges 20 and 22 by an interference fit, welding, staking, mechanical interlock of other elements to be described, or by other means.

A bushing 34 is positioned within the diametral spacing between each tubular sleeve 30 and the respective connecting and aligning pin 32. The bushings 34 are made of Delrin; however, Valox or other material may be selected to achieve several functions: (a) to flexibly take up tolerances in the assembly, (b) to reduce noise in the event there is any relative motion between the connecting and aligning pins 32 and the bushings 34, (c) to transmit torque without noticeable play ("lash"), and (d) to provide protection against corrosion at the junction of the tubular sleeves 30 and the connecting and aligning pins 32. In addition, the material for the bushings 34 is selected to provide a thermal coefficient of expansion match with steel, the material of the tubular sleeves 30 and the connecting and aligning pins 32. In that way, the fit of the bushings 34 between the connecting and aligning pins 32 and the tubular sleeves 30 will be kept relatively constant over a wide temperature range. In addition to plastic, brass, oil impregnated bronze, or other non-plastic material may be used to provide a low coefficient of friction to reduce the frictional contribution to the total separation force. The bushings 34 can also be of various configurations, including that of a tolerance ring having corrugations and a split in the axial direction.

The connecting and aligning pins 32 and bushings 34 may be assembled to provide an initial interference fit to permit manufacturing inaccuracies in order to allow cost effective processing. Namely, the tolerances for the diameter of the connecting and aligning pins 32 may be defined to allow the inside diameter of the bushings 34, and the alignment of the axis of the bushings 34 and the axis of the connecting and aligning pins to be within ranges of economical manufacturing practices.

After assembly of the separable connecting device, the assembled device may be placed in an oven to expose it to temperatures at which the bushings 34 relax, that is, the bushings 34 lose their interference fit in a controlled fashion. The purpose of this step is to obtain a fit such that friction will contribute very little or not at all to the total separation force. Practice has shown that this relaxation step can reduce the frictional contribution to the total separation force to less than 50 pounds. Testing may be employed to reject assembled devices for which the frictional contribution exceeds a predetermined value.

The connecting and aligning pins 32 terminate in free ends 36 that extend from the tubular steel sleeves 30. A shallow groove 38 near the free end 36 of each connecting and aligning pin 32 receives a snap ring 40. In the preferred embodiment shown, the snap rings 40 are generally conical, slotted disc springs having internal fingers engaging the grooves 38 and having round perimeters engaging the tubular sleeves 30. Such slotted disc springs provide a controlled snap in response to axial load.

The snap rings 40 may also be C-clips, shear pins extending through the connecting and aligning pins 32, shear nuts that can be forcibly removed by shearing threads, or other mechanical means for holding the connecting and aligning pins 32 within the tubular sleeves 30 without reliance on friction. For example, the connecting and aligning pins 32 may be undercut to form a rod that can fail in tension, or a disc may be releasably staked or welded to the end of the connecting and aligning pins 32.

Figure 5:
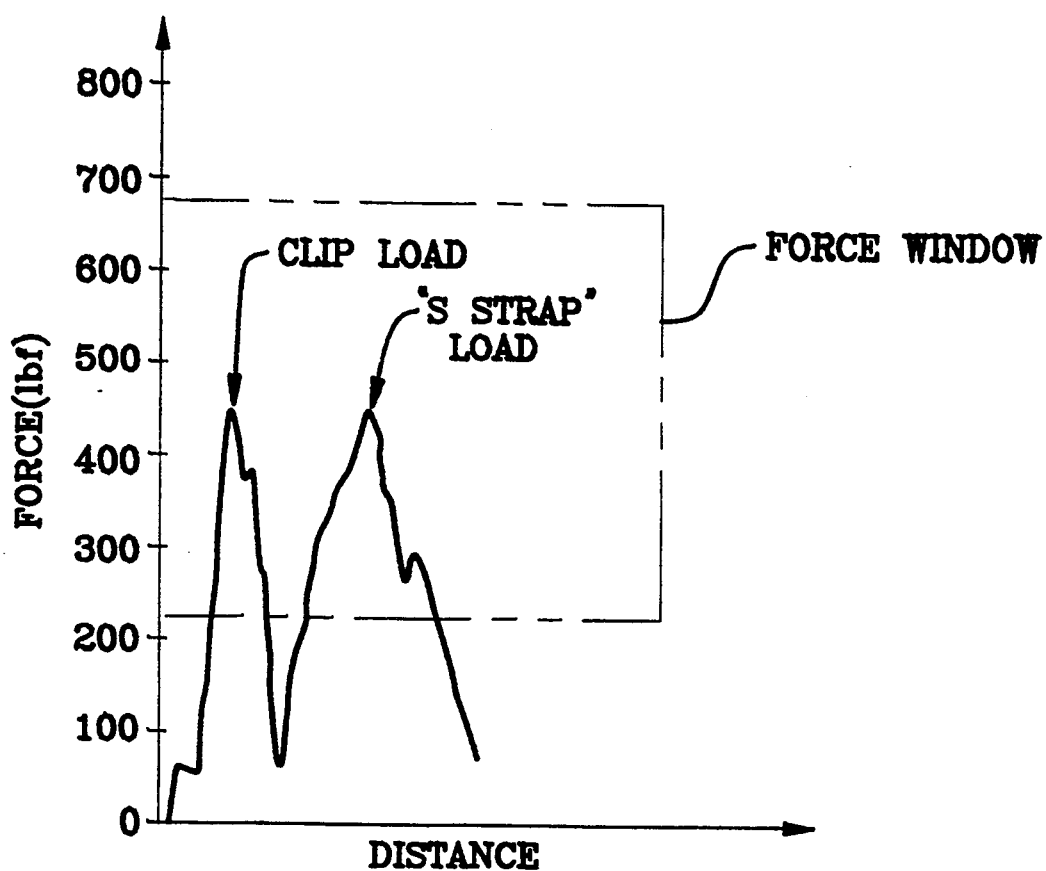
FIG. 5 is a graph of the actual separation force for the preferred embodiment of FIG. 1.

The purpose of the snap rings 40 is to resist an axial separation force until the separation force is within a specified force window. For example, a separation force may be required to be between a minimum of 225 pounds (lbf) and a maximum of 675 pounds (lbf), as illustrated in FIG. 5. The snap rings 40, or other mechanical means used, are designed so as to release resistance to axial force almost instantaneously, after the appropriate load is applied.

Figure 4:
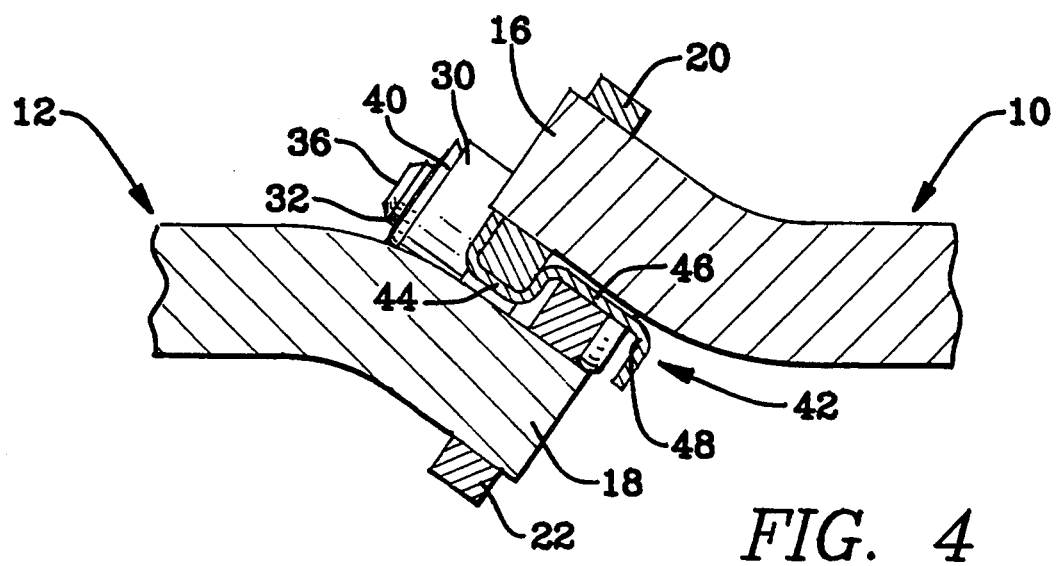
FIG. 4 is a sectional view of the embodiment of FIG. 1 taken along the line 4—4 of FIG. 2.

As shown in FIG. 4, a deformable strap 42 is positioned between the end portions 16 and 18 within the cavity 28 of the flanges 20 and 22. The deformable strap 42 is generally S-shaped in longitudinal section, having U-shaped end portions 44 and 46 that wrap loosely around the flanges 20 and 22, respectively. The purpose of the deformable strap 40 is to provide a second barrier to separation, acting subsequent to the release of the snap rings 40. The deformable strap 42 is designed to resist a separation force unless the total separation force is within the force window.

Significantly, the snap rings 40 and the deformable strap 42 operate independently and sequentially in the event of a severe vehicle impact, as follows:

First, the snap rings 40 pop off the connecting and aligning pins 32 when the axial separation force is within a first specified force window of 225 to 675 pounds (lbf). The resisting force then drops close to zero, as shown in FIG. 5. Only the incidental friction between the connecting and aligning pins 32 and the bushings 34 provides resistance. Because a space is provided between the end portion 46 and the flange 22, the deformable strap 42 does not yet contribute to the separation force.

Second, the space between the end portion 46 and the flange 22 goes to zero and the deformable strap 42 then resists separation until the separation force is within a second specified force window that may or may not be the same as the first. The separation force then decreases as the deformable strap 42 unfolds. The deformable strap 42 may be creased at bend 48 or at some other appropriate location to ensure a predictable and controlled resistance to straightening during the separation of the steering column.

Of course, the snap rings 40 may be employed without the deformable strap 42, or the deformable strap 42 may be employed without the snap rings 40. The two separation systems are fully independent of each other. Also, the two systems may be combined in either order. That is, instead of the sequence just described, the deformable strap 42 may be the first mechanism to resist separation and the snap rings 40 may be the second mechanism to resist separation.

When the two systems are combined in this latter order, the space between the end portion 46 of the deformable strap 42 and the flange 22 can be eliminated so that, in the event of a severe vehicle impact, no delay will occur before the deformable strap unfolds. Similarly, the snap rings 40 may be placed further out on the connecting and aligning pins 32, a distance beyond the tubular sleeves 30, so that the snap ring will operate only after the operation of the deformable strap is completed.

The two shaft sections 10 and 12 of the steering column separate along a trajectory defined by the oblique orientation of the connecting and aligning pins 32 and the tubular sleeves 30.

Figure 6:
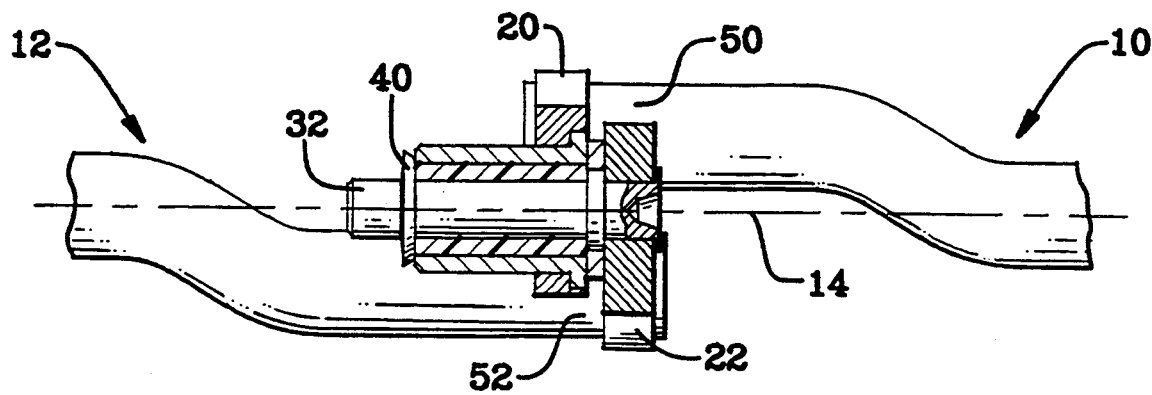
FIG. 6 is an elevational view, in section, of an intermediate portion of a steering column illustrating a second preferred embodiment of the present invention.

The inclination of the end portions 16 and 18 directs the separated shaft sections away from the common axis 14. Alternatively, the two shaft sections 10 and 12 may have end portions 50 and 52 that are offset from and parallel to the common axis 14, as shown in FIG. 6.

Figure 7:
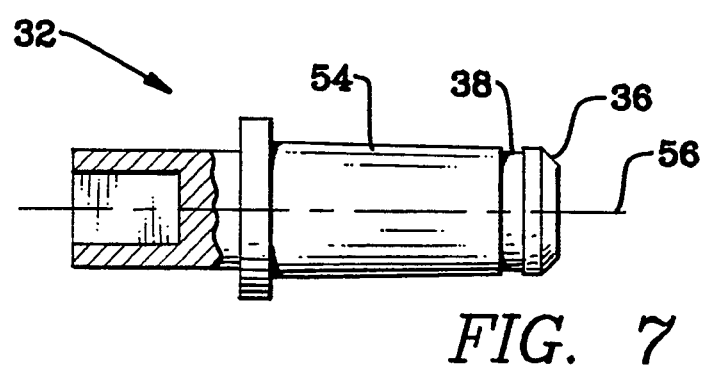
FIG. 7 is a side view of an alternative (tapered) connecting and aligning pin of the preferred embodiments of the present invention.

The connecting and aligning pins 32 may be cylindrical or may be tapered to a smaller cross-section near the free ends 36 as shown in FIG. 7. The tapered pins have side surfaces 54 that are angled from their axis 56. The tapering of the connecting and aligning pins creates a diametral spacing between the pins and the bushings 34 after the first of the two separation systems separates. This diametral spacing results in "lash" (sloppy steering) to indicate to a driver of the vehicle that one of the two mechanisms has failed.

As an alternative to the passive alert signal mechanism just described, an active alert signal means could be used. For example, an electrical contact within the separable connecting device could be interrupted to cause an electrical signal to activate a dashboard warning to indicate that integrity of the separable connecting device has been compromised. The alert signal could be tied to a computerized maintenance warning system or could cause the vehicle to be disabled after a predetermined number of miles are driven.

The present invention provides a high reliability system with dual mechanical systems to hold and release two shaft sections of a steering column. Neither system relies upon friction. The second mechanism serves as a backup to the first mechanism to ensure that the intended function will be performed in the event of a severe vehicle impact. Each of the two mechanisms may be designed to function at the same separation force or, alternatively, each mechanism may be designed to separate within a different separation force window.

Having described the invention, what is claimed is:

1. A separable connecting device between two shaft sections which have a common axis and which include overlapping end portions, said device comprising:
   at least one connecting pin on at least one of said end portions;
   sleeve means on the end portion opposite said connecting pin for receiving the connecting pin, the connecting pin extending through and beyond the sleeve means, the portion of the connecting pin extending beyond the sleeve means defining an end; and
   a retainer attached to the end of the at least one connecting pin, the retainer holding the connecting pin within the sleeve means and releasing the connecting pin from the sleeve means when a predetermined force is applied substantially along the common axis.

2. The separable connecting device of claim 1 further comprising flange means on each said end portion for mounting the connecting pins and sleeve means.

3. A separable connecting device between two shaft sections having a common axis and which include overlapping end portions, the device comprising:
   a flange fixed to and extending from each said end portion;
   connecting pins extending from at least one of said flanges;
   sleeve means on at least one of said flanges for providing between the end portions openings complementary to the connecting pins such that each connecting pin extends from one flange through an opening of the sleeve means in the other flange, the connecting pin extending beyond the sleeve means, the portion of the connecting pin extending beyond the sleeve means defining an end; and
   a retainer attached to the end of the connecting pins, the retainer holding the connecting pins within the sleeve means and releasing the connecting pins from the sleeve means when a predetermined force is applied substantially along the common axis.

4. The separable connecting device of claim 3 wherein at least one end portion is offset and inclined with respect to the common axis and wherein said connecting pins are disposed obliquely with respect to the common axis.

5. The separable connecting device of claim 3 wherein at least one end portion is offset and parallel with respect to the common axis and wherein said connecting pins are disposed parallel to the common axis.

6. The separable connecting device of claim 3 wherein each flange includes two lateral projecting portions which define therebetween a cavity for the passage of the end portion to which the other flange is mounted.

7. The separable connecting device of claim 6 wherein the connecting pins are fixed to at least one of said lateral projecting portions.

8. The separable connecting device of claim 3 wherein the sleeve means includes a tubular sleeve aligned with each corresponding connecting pin such that the tubular sleeve is engageable by the mechanical means to hold said connecting pin within the tubular sleeve and to release said connecting pin from the tubular sleeve when the predetermined force is applied.

9. The separable connecting device of claim 8 wherein said sleeve means includes a bushing between the tubular sleeve and the connecting pin to facilitate coaxial alignment of the connecting pin and the tubular sleeve and to reduce lash.

10. The separable connecting device of claim 3 wherein the connecting pins are tapered to a smaller cross-sectional area at the free ends of the connecting pins.

11. A separable connecting device between two shaft sections having a common axis and which include overlapping end portions, the device comprising:
   a flange fixed to and extending from each said end portion;
   aligning pins extending from at least one of said flanges;
   sleeve means on at least one of said flanges for providing openings complementary to the aligning pins such that each aligning pin extends from one flange into an opening of the sleeve means in the other flange; and
   a bendable strap, the strap holding the flanges together and releasing the flanges when a predetermined force is applied substantially along the common axis, the strap being bendable by the flanges to a partially straightened configuration when the predetermined force is applied, the partially straightened strap releasing the flanges.

12. The separable connecting device of claim 11 wherein the bendable strap has a substantially S-shaped configuration before the predetermined force is applied.

13. The separable connecting device of claim 11 wherein each flange includes two lateral projecting portions which define therebetween a cavity for the strap means and for the passage of the end portion to which the other flange is mounted.

14. The separable connecting device of claim 11 wherein the strap remains an undivided unitary piece when the flanges are released.

* * * * *

UNITED STATES PATENT AND TRADEMARK OFFICE
CERTIFICATE OF CORRECTION

PATENT NO.  : 5,336,013
DATED       : August 9, 1994
INVENTOR(S) : Paul E. Duffy, John Hanson, Robert Lugosi,
              Spencer H. Guptill, Matthew T. Kackowski It is certified that error appears in the above—identified patent and that said Letters Patent is hereby corrected as shown below:

In claim 8, column 6, lines 27-28, delete "mechanical means" and replace with --retainer--.

Signed and Sealed this

First Day of November, 1994

Attest:

Attesting Officer

BRUCE LEHMAN

Commissioner of Patents and Trademarks